US011333257B2

(12) United States Patent
Ikemoto et al.

(10) Patent No.: US 11,333,257 B2
(45) Date of Patent: May 17, 2022

(54) COOLING WATER CONTROL VALVE DEVICE

(71) Applicant: DENSO CORPORATION, Kariya (JP)

(72) Inventors: Tadashi Ikemoto, Kariya (JP); Akihiro Kamiya, Kariya (JP); Masao Ino, Kariya (JP)

(73) Assignee: DENSO CORPORATION, Kariya (JP)

( * ) Notice: Subject to any disclaimer, the term of this patent is extended or adjusted under 35 U.S.C. 154(b) by 51 days.

(21) Appl. No.: 16/897,530

(22) Filed: Jun. 10, 2020

(65) Prior Publication Data

US 2020/0300375 A1    Sep. 24, 2020

Related U.S. Application Data

(63) Continuation of application No. PCT/JP2018/045536, filed on Dec. 11, 2018.

(30) Foreign Application Priority Data

Dec. 12, 2017  (JP) .............................. JP2017-237663

(51) Int. Cl.
   *F16K 11/076*   (2006.01)
   *F01P 7/14*   (2006.01)
   (Continued)

(52) U.S. Cl.
   CPC .............. *F16K 11/076* (2013.01); *F01P 7/14* (2013.01); *F01P 3/02* (2013.01); *F01P 7/16* (2013.01);
   (Continued)

(58) Field of Classification Search
   CPC .. F16K 11/076; F16K 11/0853; F16K 5/0689; F16K 5/0678; F16K 27/00;
   (Continued)

(56) References Cited

U.S. PATENT DOCUMENTS 5,152,321 A * 10/1992 Drager ................ F16K 11/0856
                                                            137/625.29
5,931,196 A *  8/1999 Bernardi ............. F16K 11/0856
                                                            137/625.46
(Continued)

OTHER PUBLICATIONS

U.S. Appl. No. 16/897,519, to Tadashi Ikemoto entitled: "Cooling Water Control Valve Device and Engine Cooling System Using the Same", filed Jun. 10, 2020 (42 pages).

*Primary Examiner* — Matthew W Jellett
*Assistant Examiner* — Christopher D Ballman
(74) *Attorney, Agent, or Firm* — Nixon & Vanderhye P.C.

(57) ABSTRACT

A cooling water control valve device includes a housing and a valve. The housing includes an inside space, an attachment surface, at least one inlet port, and at least one outlet port. The attachment surface is in contact with an outer wall of the engine. The valve is disposed in the inside space to control communication between the at least one inlet port and the at least one outlet port by rotating. The housing includes a housing body that defines the inside space therein and a bypass passage forming member that defines at least a portion of a bypass passage. The bypass passage bypasses the valve and fluidly connects the at least one inlet port and the inside space. The housing is attached to the engine such that the attachment surface comes into contact with the outer wall of the engine.

4 Claims, 10 Drawing Sheets

(51) Int. Cl.
*F16K 27/00* (2006.01)
*F01P 7/16* (2006.01)
*F01P 3/02* (2006.01)
*F16K 11/085* (2006.01)
*F16K 5/06* (2006.01)

(52) U.S. Cl.
CPC ....... *F01P 2007/146* (2013.01); *F16K 5/0678* (2013.01); *F16K 5/0689* (2013.01); *F16K 11/0853* (2013.01); *F16K 27/00* (2013.01)

(58) Field of Classification Search
CPC .......... F01P 2007/146; F01P 7/14; F01P 7/16; F01P 3/02
See application file for complete search history.

(56) References Cited

U.S. PATENT DOCUMENTS

| | | | | |
|---|---|---|---|---|
| 6,840,502 B2 * | 1/2005 | Haushaelter | .......... | F16K 1/2263 251/173 |
| 7,610,931 B2 * | 11/2009 | Wittig | ..................... | F16K 11/20 137/551 |
| 8,776,829 B2 * | 7/2014 | Sugie | .................... | F16K 11/076 137/625.46 |
| 9,089,681 B2 * | 7/2015 | Ueda | .................... | A61M 39/223 |
| 9,567,894 B2 * | 2/2017 | Oikawa | ................. | F16K 5/0471 |
| 10,428,721 B2 * | 10/2019 | Murakami | ................ | F01P 7/16 |
| 10,458,562 B2 * | 10/2019 | Ozeki | ........................ | F01P 3/20 |
| 10,626,999 B2 * | 4/2020 | Ozeki | ................. | F16K 11/0856 |
| 2003/0098077 A1 * | 5/2003 | McLane | ............. | F16K 11/0856 137/625.47 |
| 2010/0282190 A1 * | 11/2010 | Stoermer | ............ | F16K 11/0856 123/41.08 |
| 2013/0105322 A1 * | 5/2013 | Averbeck | ................ | C02F 1/008 204/554 |
| 2013/0221116 A1 * | 8/2013 | Tsuchiya | .............. | G05D 23/134 236/34.5 |
| 2013/0263949 A1 * | 10/2013 | Bartnick | ............. | F16K 11/0856 137/625 |
| 2015/0075452 A1 | 3/2015 | Oikawa et al. | | |
| 2016/0281585 A1 * | 9/2016 | Muizelaar | ............. | F16K 31/042 |
| 2019/0390781 A1 * | 12/2019 | Ozeki | ..................... | F16K 5/181 |
| 2020/0049263 A1 * | 2/2020 | Ozeki | .................... | F16K 11/076 |

* cited by examiner

COOLING WATER CONTROL VALVE DEVICE

CROSS REFERENCE TO RELATED APPLICATIONS

This application is a continuation application of International Patent Application No. PCT/JP2018/045536 filed on Dec. 11, 2018, which designated the U.S. and claims the benefit of priority from Japanese Patent Application No. 2017-237663 filed on Dec. 12, 2017. The entire disclosure of all of the above application is incorporated herein by reference.

TECHNICAL FIELD

The present disclosure relates to a cooling water control valve device.

BACKGROUND ART

There has been known a cooling water control valve device that is attached to an engine and that can control a flow rate of cooling water flowing through the engine. For example, in a housing of a cooling water control valve device, a plurality of ports each extending radially outward of the valve are formed along a circumferential direction. Therefore, the housing of the cooling water control valve device may have a relatively large size in a radial direction of the valve.

SUMMARY

One aspect of the present disclosure is a cooling water control valve device that is attached to an engine and is capable of controlling a flow rate of the cooling water flowing through the engine. The device includes a housing and a valve. The housing includes an inside space, an attachment surface, at least one inlet port, and at least one outlet port. The attachment surface is configured to be in contact with an outer wall of the engine. The at least one inlet port is in communication with the inside space and open on the attachment surface. The cooling water from the engine flows into the at least one inlet port, and the inside space is in communication with an outside through the at least one outlet port. The valve is disposed in the inside space to control communication between the at least one inlet port and the at least one outlet port by rotating. The housing includes a housing body that defines the inside space therein and a bypass passage forming member that defines at least a portion of a bypass passage. The bypass passage bypasses the valve and fluidly connects the at least one inlet port and the inside space. The housing is attached to the engine such that the attachment surface comes into contact with the outer wall of the engine.

BRIEF DESCRIPTION OF DRAWINGS

The above and other objects, features and advantages of the present disclosure will become more apparent from the following detailed description made with reference to the accompanying drawings.

DESCRIPTION OF EMBODIMENTS

Hereinafter, embodiments of the present disclosure will be described with reference to the drawings. In the following embodiments, the same or equivalent parts are denoted by the same reference numerals as each other, and explanations will be provided to the same reference numerals for simplifying descriptions.

To begin with, a relevant technology will be described only for understanding the technical significance of the following embodiments. A housing of a cooling water control valve device typically has a relatively large radial size of the valve. Therefore, it may be difficult to arrange the engine in a narrow space that faces the outer wall of the engine when the housing is attached to the outer wall of the engine so that one of the plurality of ports faces the engine.

Further, in a cooling water control valve device, some of the plurality of ports are provided with tubular sealing members that seal spaces between the ports and the outer circumferential surface of the valve in a liquid-tight manner. Since each of the sealing members has a predetermined length in an axial direction, each of the ports of the housing of the cooling water control valve device may have a larger size in which the sealing member is disposed. Therefore, when the housing is attached to the engine so that the ports in which the sealing members are disposed face the engine, it may be more difficult to arrange the housing in the narrow space that faces the outer wall of the engine.

It is an object of the present disclosure to provide a cooling water control valve device that can be easily arranged in a narrow space.

As described above, one aspect of the present disclosure is a cooling water control valve device that is attached to an engine and is capable of controlling a flow rate of the cooling water flowing through the engine. The device includes a housing and a valve. The housing includes an inside space, an attachment surface, at least one inlet port, and at least one outlet port. The attachment surface is configured to be in contact with an outer wall of the engine. The at least one inlet port is in communication with the inside space and open on the attachment surface. The cooling water from the engine flows into the at least one inlet port, and the inside space is in communication with an outside through the at least one outlet port. The valve is disposed in the inside space to control communication between the at least one inlet port and the at least one outlet port by rotating. The housing includes a housing body that defines the inside space therein and a bypass passage forming member that defines at least a portion of a bypass passage. The bypass passage bypasses the valve and fluidly connects the at least one inlet port and the inside space. The housing is attached to the engine such that the attachment surface comes into contact with the outer wall of the engine.

Accordingly, by forming a part of the bypass passage to extend in a direction parallel to the attachment surface, the size of the housing in a direction perpendicular to the attachment surface can be reduced. Thus, even when the housing is attached to the engine to have the inlet port face the engine, the housing of the cooling water control valve device can be easily set in the narrow space that faces the outer wall of the engine.

One Embodiment

Figure 1:
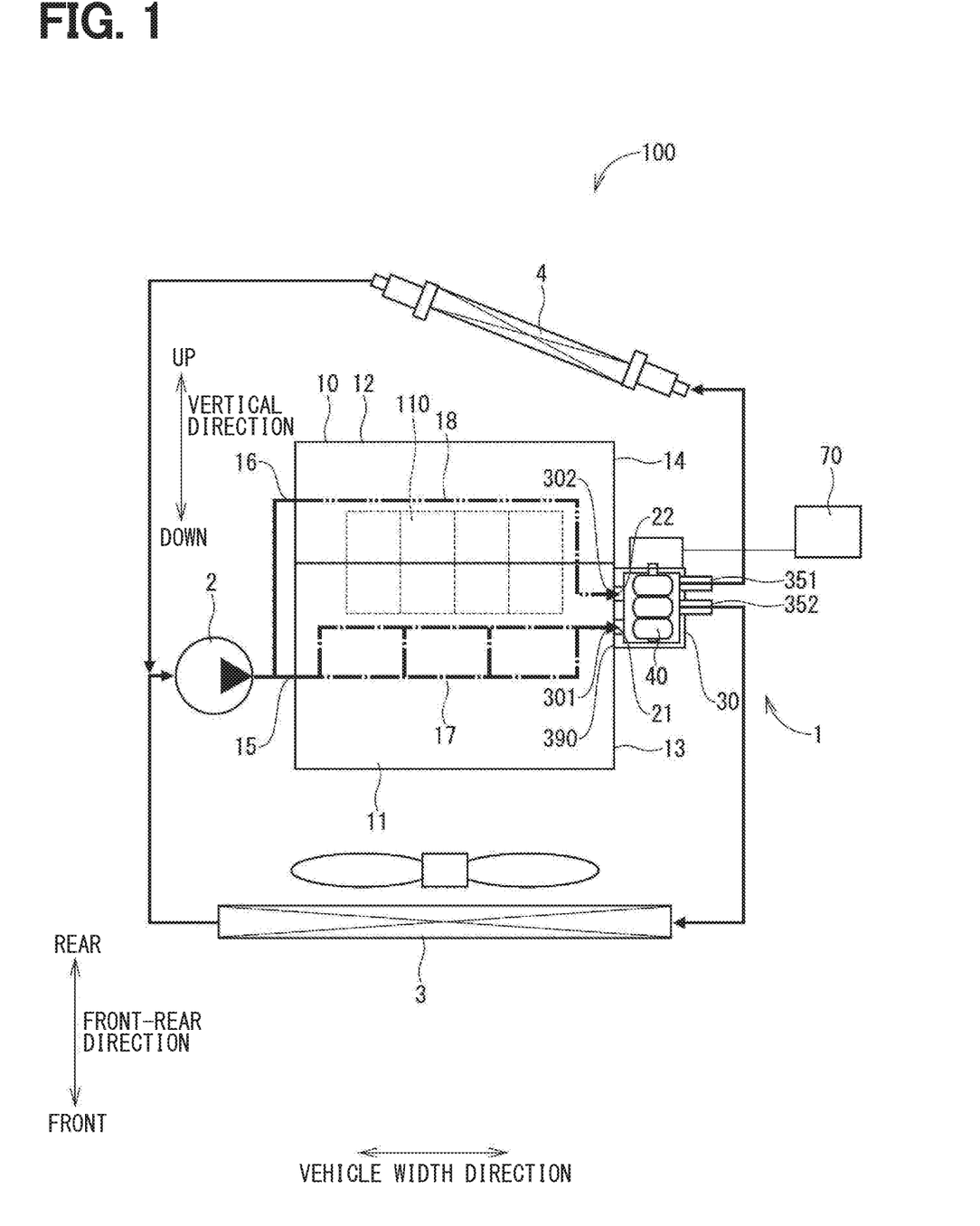
FIG. 1 shows a schematic view of an engine cooling system to which a cooling water control valve device according to an embodiment is applied.

FIG. 1 shows a cooling water control valve device according to an embodiment and an engine cooling system to which the cooling water control valve device is applied.

The engine cooling system 100 is mounted in, for example, a vehicle (not shown). As shown in FIG. 1, the engine cooling system 100 includes an engine 10, the cooling water control valve device 1, a water pump 2, a radiator 3, and the like. A heater core 4 is mounted in the vehicle.

The engine 10 has an engine block 11 and an engine head 12. The engine block 11 has a block outer wall 13 which is one of a plurality of outer walls forming an outline of the engine block 11. The block outer wall 13 is formed in a planar shape. The engine head 12 has a head outer wall 14, which is one of a plurality of outer walls forming an outline of the engine head 12. The head outer wall 14 is formed in a planar shape. The engine 10 is mounted in the vehicle such that the block outer wall 13 and the head outer wall 14 are substantially parallel to the vertical direction and the front-rear direction of the vehicle, and are substantially perpendicular to the vehicle width direction.

The engine block 11 and the engine head 12 are joined to each other so that the block outer wall 13 and the head outer wall 14 are located on substantially a common plane. The engine block 11 is located below the engine head 12 in the vertical direction. A combustion chamber 110 is formed inside the engine 10 so as to extend across the engine block 11 and the engine head 12. When the fuel is burned in the combustion chamber 110, the driving force is output from the engine 10 to drive the vehicle.

A first inlet 15 is formed on an outer wall of the engine block 11 opposite to the block outer wall 13. A second inlet 16 is formed on an outer wall of the engine head 12 opposite to the head outer wall 14. A first outlet 21 and a second outlet 22 are formed on the block outer wall 13 of the engine block 11.

A block channel 17 and a head channel 18 are formed inside the engine 10. The block channel 17 is formed in the engine block 11 to fluidly connect the first inlet 15 and the first outlet 21. The head channel 18 is formed to fluidly connect the second inlet 16 and the second outlet 22. Here, most of the head passage 18 including a portion close to the second inlet 16 is formed in the engine head 12, and only an end portion of the head passage 18 close to the second outlet 22 is formed in the engine block 11.

An outlet of the water pump 2 is fluidly connected to each of the first inlet 15 and the second inlet 16. The cooling water control valve device 1 is disposed in the engine 10 such that a first inlet port 301 and a second inlet port 302 formed in a housing 30 (described later) are fluidly connected to the first outlet 21 and the second outlet 22, respectively. An outlet port 351 and an outlet port 352 formed in the housing 30 of the cooling water control valve device 1 are fluidly connected to an inlet of the heater core 4 and an inlet of the radiator 3, respectively. An outlet of the radiator 3 and an outlet of the heater core 4 are fluidly connected to an inlet of the water pump 2.

The block channel 17 and the head channel 18 are filled with cooling water. When the water pump 2 operates, the cooling water is discharged from the outlet port of the water pump 2 and flows into the block channel 17 and the head channel 18 via the first inlet 15 and the second inlet 16, respectively. The cooling water flowing through each of the block chamber 17 and the head chamber 18 flows into the housing 30 of the cooling water control valve device 1 via the first outlet 21 and the second outlet 22. Here, the communication between the first and second inlet ports 301, 302 and the outlet ports 351, 352 changes depending on the rotational position of the valve 40 in the housing 30.

When the first inlet port 301 or the second inlet port 302 and the outlet port 351 are in communication with each other at a rotational position of the valve 40, the cooling water flows into the heater core 4 via the outlet port 351. In this manner, the vehicle interior can be heated. The cooling water that has radiated heat at the heater core 4 flows into the inlet of the water pump 2, is discharged from the outlet of the water pump 2, and flows into the block channel 17 or the head channel 18 of the engine 10.

When the first inlet port 301 or the second inlet port 302 and the outlet port 352 are in communication with each other at a rotational position of the valve 40, the cooling water flows into the radiator 3 via the outlet port 352. Thereby, the cooling water radiates heat, and its temperature decreases. The cooling water that has radiated heat at the radiator 3 and decreased in temperature flows into the inlet of the water pump 2, is discharged from the outlet of the water pump 2, and flows into the block channel 17 or the head channel 18 of the engine 10. The cooling water that has decreased in temperature flows through the block channel 17 or the head channel 18, and as a result the engine 10 that has increased in temperature due to combustion of fuel in the combustion chamber 110 can be cooled.

In the present embodiment, since the block chamber 17 is formed in the engine block 11 and the most of the head chamber 18 is formed in the engine head 12, the engine block 11 and the engine head 12 can be efficiently cooled by the cooling water. As described above, in the present embodiment, both the first outlet 21 through which the cooling water from the engine block 11 flows out and the second outlet 22 through which the cooling water from the engine head 12 flows out are formed on the block outer wall 13 of the engine block 11.

As shown in FIGS. 2 to 6, the cooling water control valve device 1 includes the housing 30, the valve 40, a driving unit 50, sealing members 61 to 63, an electronic control unit (hereinafter, referred to as "ECU") 70 as a control unit, and the like. The housing 30 has a housing body 31, a housing lid 32, a cover 33, a bypass channel forming member 34, a pipe 35, a supporter 36, and the like.

The housing body 31 is formed of, for example, resin in a box-like shape. An inside space 300 is formed in the housing body 31. The attachment surface 390 is formed on one of a plurality of outer walls forming an outline of the housing body 31. The attachment surface 390 is formed in a planar shape. The attachment surface 390 has a plurality of recesses 391 that are recessed toward the inside space 300 (see FIG. 3).

The first inlet port 301 and the second inlet port 302, as at least one inlet port, are formed, and open, on the attachment surface 390. The second inlet port 302 is in communication with the inside space 300. Fixing members 315 to 317 are formed on the outer edge of the attachment surface 390 of the housing body 31. The fixing member 315 is formed close to the first inlet port 301. The second member 316 is formed close to the second inlet port 302. The fixing member 317 is formed at a position away from the first inlet port 301 and the second inlet port 302 by a specified distance. Note that a part of the attachment surface 390 is also formed in the fixing members 315 to 317.

Each of the fixing members 315 to 317 has a fixing hole 318 formed therein. In the present embodiment, the housing body 31 is attached to the engine 10 such that the first inlet port 301 and the second inlet port 302 are fluidly connected to the first outlet 21 and the second outlet 22, respectively, while the attachment surface 390 is brought into contact with the block outer wall 13 of the engine block 11. Here, a bolt 19 is inserted into each of the fixing holes 318 of the fixing members 315 to 317 and screwed into the engine block 11, whereby the housing body 31 is fixed to the engine block 11. The housing body 31 is attached to the engine 10 such that the attachment surface 390 does not come into contact with the head outer wall 14 but only comes into contact with the block outer wall 13 (see FIG. 6).

An opening 320 is formed on an outer wall that is one of the plurality of outer walls forming the outline of the housing body 31. The outer wall is perpendicular to the attachment surface 390 and faces forward in the front-rear direction of the vehicle when the housing body 31 is attached to the engine 10. The housing opening 320 is in communication with the inside space 300. The housing lid 32 is disposed on the housing body 31 to close the housing opening 320. The cover 33 is disposed to cover a side of the housing lid 32 opposite to the housing body 31.

The housing body 31 has cylindrical spaces 311 to 314 formed therein. The cylindrical spaces 311 to 313 are configured to fluidly connect a specific outer wall 300 and the inside space 300. The specific outer wall 310 is one of the plurality of the outer walls defining the outline of the housing body 31 and is perpendicular to the attachment surface 390. The specific outer wall 310 faces upward in the vertical direction when the housing body 31 is attached to the engine 10. That is, the cylindrical spaces 311 to 313 are open on the specific outer wall 310. Each of the cylindrical spaces 311 to 313 is formed in a substantially cylindrical shape so that its axis extends along the vertical direction when the housing body 31 is attached to the engine 10. The cylindrical spaces 311 to 313 are arranged in the housing body 31 at predetermined intervals in the front-rear direction of the vehicle. In the present embodiment, the inner diameter of the cylindrical space 311 and the inner diameter of the cylindrical space 312 are substantially the same. The inner diameter of the cylindrical space 313 is greater than the inner diameter of the cylindrical space 311 and the inner diameter of the cylindrical space 312. The cylindrical space 314 is formed in a substantially cylindrical shape to fluidly connect the second inlet port 302 and the inside space 300.

The supporter 36 has three support cylinders 361 each having a substantially cylindrical shape. The three support cylinders 361 are formed such that their axes are parallel to each other and are arranged linearly at predetermined intervals. The supporters 36 are disposed in the housing body 31 such that each of the three support cylinders 361 is located in a respective one of the cylindrical spaces 311 to 313.

The housing body 31 has a passage space 319 formed therein. The passage space 319 is formed to fluidly connect the specific outer wall 310 and the first inlet port 301. Here, the passage space 319 extends from the first inlet port 301 in a direction perpendicular to the attachment surface 390, is bent vertically upward, and then extends along the vertical direction to the specific outer wall 310.

The bypass channel forming member 34 is formed of, for example, a resin. The bypass passage forming member 34 is fixed to the supporter 36 to cover a surface of the supporter 36 that is opposite to the housing body 31 and is corresponding to the passage space 319 and the cylindrical space 311. The space inside the bypass channel forming member 34 fluidly connects the passage space 319 and the cylindrical space 311. Thus, a bypass passage 303 is formed in the passage space 319, the inside of the bypass passage forming member 34, and the cylindrical space 311. The bypass passage 303 extends from the first inlet port 301 in the passage space 319 in a direction perpendicular to the attachment surface 390. Then, the bypass passage 303 is bent upward in the vertical direction and extends upward in the vertical direction. The bypass passage 303 is bent forward and extends in the front-rear direction of the vehicle in the bypass passage forming member 34. The bypass passage 303 is bent downward in the vertical direction in the bypass passage forming member 34. Then, the bypass passage 303 extends in the vertical direction to be fluidly connected to the inside space 300. That is, the bypass forming member 34 defines at least a part of the bypass passage 303 that fluidly connects the first inlet port 301 and the inside space 300 while bypassing the inside space 300.

The pipe 35 is formed of, for example, resin. The pipe 35 is fixed to the supporter 36 to cover a portion of the surface of the supporter 36 that is opposite to the housing body 31 and is corresponding to the cylindrical spaces 312 and 313. The pipe 35 has a cylindrical outlet port 351 for fluidly connecting the inside space 300 with the outside via the cylindrical space 312 and a cylindrical outlet port 352 for fluidly connecting the inside space 300 with the outside via the cylindrical space 313. Note that the inner diameter of the outlet port 352 is greater than the inner diameter of the outlet port 351. As described above, the outlet port 351 is fluidly connected to the heater core 4, and the outlet port 352 is fluidly connected to the radiator 3. In the present embodiment, the bypass passage forming member 34 and the pipe 35 are integrally formed.

The valve 40 is disposed in the inside space 300 of the housing body 31. The valve 40 has a valve body 41 and a valve shaft 42. The valve body 41 is formed in a cylindrical shape with, for example, resin. The valve shaft 42 is formed in a linear shape with, for example, metal. The valve shaft 42 is integrally formed with the valve body 41 such that its axis is aligned with an axis of the valve body 41.

One end of the valve shaft 42 is rotatably supported by a bearing member provided in an inner wall of the housing body 31, and the other end of the valve body 42 is rotatably supported by the housing lid 32. Thus, the valve 40 is supported by the housing 30 to be rotatable about the axis of the valve body 41. The other end of the valve shaft 42 protrudes into a space between the housing lid 32 and the cover 33.

The valve body 41 has valve openings 401 to 404 formed therein. The valve openings 401 to 404 are formed to fluidly connect an inner circumferential wall and an outer circumferential wall of the valve body 41. The valve openings 401, 402, 404, and 403 are arranged in this order at predetermined intervals in the axial direction of the valve body 41. The valve opening 401 is formed at a position corresponding to the cylindrical space 311 in the axial direction of the valve body 41. Therefore, the first inlet port 301 can be in communication with an inside space of the valve body 41 via the cylindrical space 311 and the valve opening 401. The valve opening 402 is formed at a position corresponding to the cylindrical space 312 in the axial direction of the valve body 41. Therefore, the outlet port 351 can be in communication with an inside space of the valve body 41 via the cylindrical space 312 and the valve opening 402. The valve opening 403 is formed at a position corresponding to the cylindrical space 313 in the axial direction of the valve body 41. Therefore, the outlet port 352 can be in communication with the inside space of the valve body 41 via the cylindrical space 313 and the valve opening 403. The valve opening 404 is formed at a position corresponding to the second inlet port 302 in the axial direction of the valve body 41. Therefore, the second inlet port 302 can be in communication with the inside space of the valve body 41 via the cylindrical space 314 and the valve opening 404. Note that the size of the valve opening 401 in the axial direction and the size of the valve opening 402 in the axial direction are substantially the same. The size of the valve opening 403 in the axial direction is larger than the size of the valve opening 401 and the size of the valve opening 402 in the axial direction.

Each of the valve openings 401, 402, and 403 is formed in a portion of the valve body 41 in the circumferential direction. Note that ranges of the valve body 41 in which the valve openings 401, 402, and 403 extend in the circumferential direction are different from each other. Therefore, the communication state between the first inlet port 301, the outlet port 351, the outlet port 352, and the inside space of the valve body 41 changes depending on rotational positions of the valve body 41. On the contrary, the valve opening 404 is formed over the entire range of the valve body 41 in the circumferential direction. Therefore, regardless of the rotational position of the valve main body 41, the second inlet port 302 and the inside space of the valve main body 41 are always in communication with each other.

The driving unit 50 is provided in a space between the housing lid 32 and the cover 33. The driving unit 50 has a motor 51 and a gear 52. The motor 51 outputs a torque from a motor shaft when energized. The gear 52 is provided between the motor shaft and the other end of the valve shaft 42. The torque output from the motor shaft of the motor 51 is transmitted to the valve shaft 42 via the gear 52. Thereby, the valve 40 rotates about the axis of the valve body 41. Note that a connector 331 is formed on the cover 33. An ECU 70 described later is connected to the connector 331.

The sealing members 61 to 63 are disposed in the cylindrical spaces 311 to 313, respectively. Each of the sealing members 61 to 63 has a seal 601, a sleeve 602, a valve seal 603, and a spring 604. Since the elements constituting the sealing members 61 to 63 have the same structure, the sealing member 63 will be described with reference to FIG. 7. The seal 601 is formed in a ring shape with, for example, rubber or the like. The seal 601 is disposed in the inner wall of the support cylinder 361 of the supporter 36. The sleeve 602 is formed, for example, of metal and has a cylindrical shape. The sleeve 602 has an outer circumferential wall at one end thereof. The outer circumferential wall is configured to be slidable with an inner circumferential wall of the seal 601. The sleeve 602 is configured to move reciprocatably in the axial direction.

Figure 7:
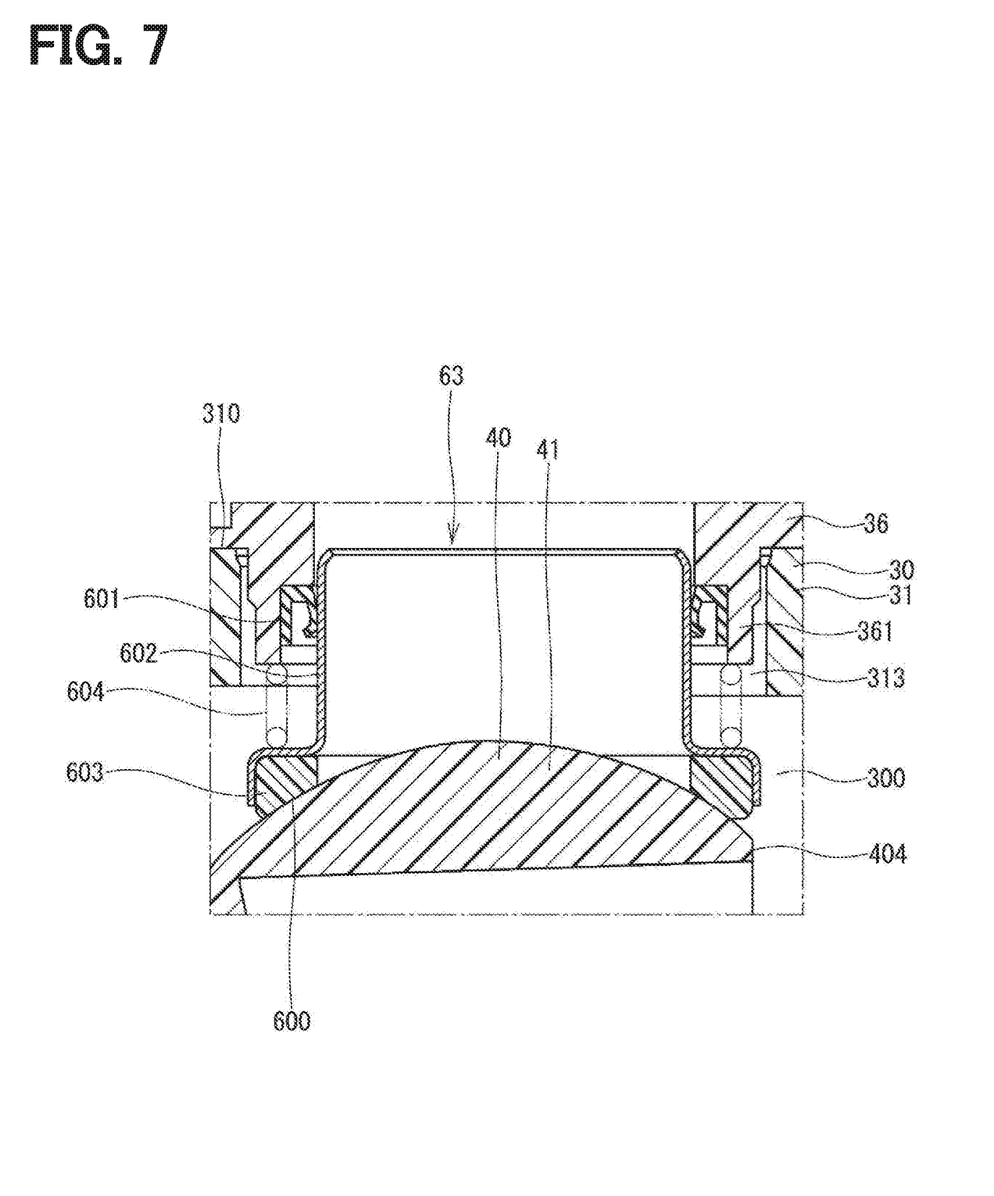
FIG. 7 is a cross-sectional view showing a sealing member and vicinity components of the cooling water control valve device according to the embodiment.

The valve seal 603 is formed in an annular shape by, for example, resin. The valve seal 603 is provided at the other end of the sleeve 602 to be coaxial with the sleeve 602. An annular contact surface 600 is formed on a side of the valve seal 603 opposite to the sleeve 602. The contact surface 600 is configured to be in contact with the outer circumferential wall of the valve body 41. The spring 604 is provided between the support cylinder 361 and the other end of the sleeve 602. The spring 604 biases the valve seal 603 against the outer circumferential wall of the valve main body 41 via the other end of the sleeve 602. Thereby, the contact surface 600 of the valve seal 603 comes into close contact with the outer circumferential wall of the valve body 41. Therefore, the space between the contact surface 600 and the outer circumferential wall of the valve body 41 is liquid-tightly sealed. Therefore, when the opening of the valve seal 603 close to the valve body 41 does not overlap with the valve opening 403, that is, when the valve opening 403 is closed, the space between the inside space of the sleeve 602 and a portion of the inside space 300 radially outward of the valve body 41 is shut off. Therefore, when the valve opening 403 is closed, communication between the outlet port 352 and the portion of the inside space 300 radially outward of the valve body 41 can be reliably cut off.

The sealing members 61 and 62 provided in the cylindrical spaces 311 and 312 serve similarly to the sealing member 63. That is, when the valve opening 401 is closed, communication between the first inlet port 301 and the portion of the inside space 300 radially outward of the valve body 41 can be reliably cut off. Furthermore, when the valve opening 402 is closed, communication between the outlet port 351 and the portion of the inside space 300 radially outward of the valve body 41 can be reliably cut off.

Next, control of the rotational position of the valve 40 by the ECU 70 will be described. The ECU 70 is a small computer having a CPU as an arithmetic unit, a ROM, a RAM, an EEPROM as a storage unit, and an I/O as an input/output unit. The ECU 70 performs calculations in accordance with programs stored in the ROM or the like based on information such as signals from various sensors provided in various parts of the vehicle, and controls operations of various devices of the vehicle. As described above, the ECU 70 executes the program stored in the non-transitional substantial recording medium. When the program is executed, a method corresponding to the program is executed.

The ECU 70 controls the operation of the motor 51 by controlling the energization of the motor 51, and thereby controlling the rotational position of the valve 40. The ECU 70 can detect the rotational position of the valve 40 by using a rotation sensor 71 provided close to the other end of the valve shaft 42. The ECU 70 controls the operation of the motor 51 based on the rotational position of the valve 40 detected by the rotation sensor 71 so that the rotational position of the valve 40 becomes a target rotational position.

Figure 8:
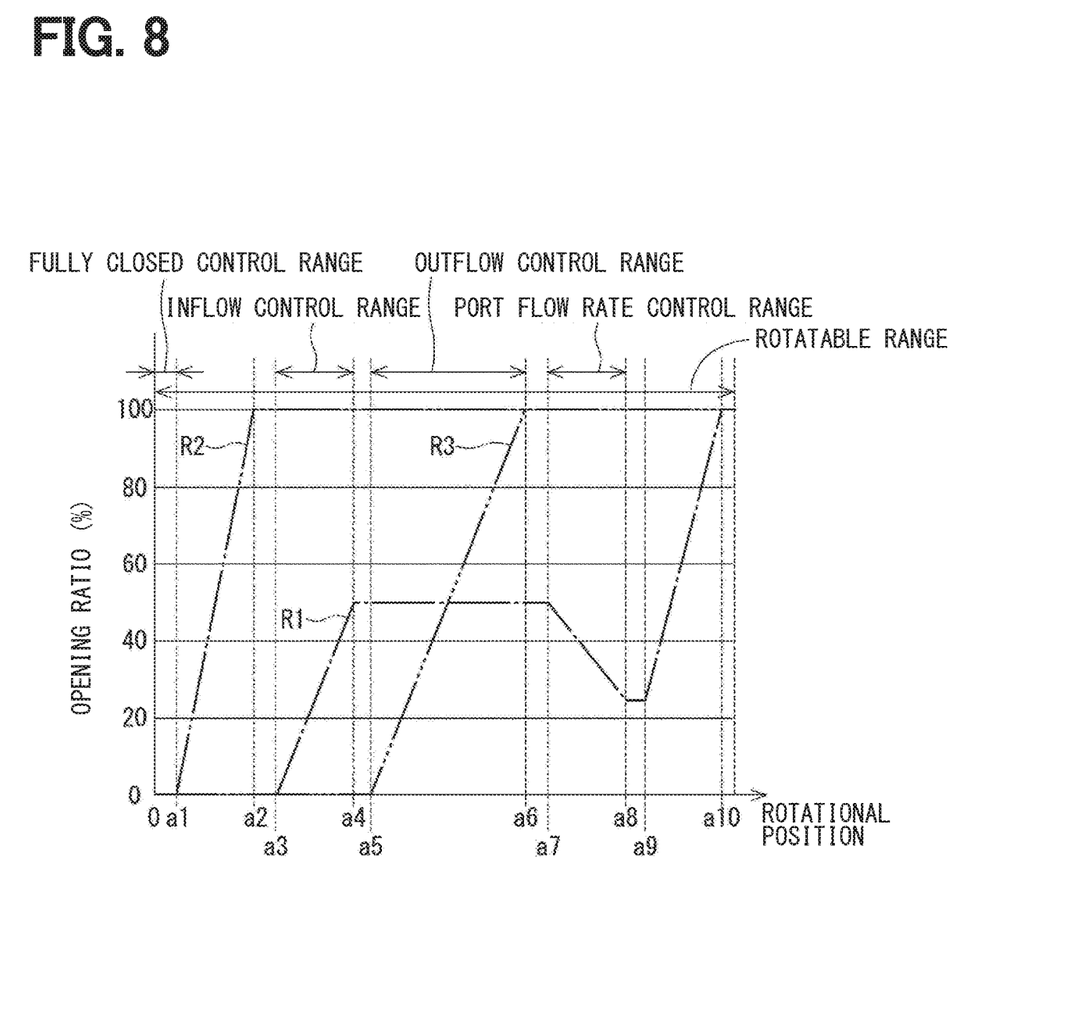
FIG. 8 is a diagram illustrating a relationship between a rotation position of the valve of the cooling water control valve device and an opening ratio of a valve opening according to the embodiment.

FIG. 8 shows a relationship between the rotational position (degrees) of the valve 40 and the opening ratio of the valve openings 401 to 403 inside the valve seal 603, that is, the ratio (%) of the opening area of the valve openings 401 to 403 to the opening area of the contact surface 600 of the valve seal 603. The valve 40 is rotatable within the range of the rotational positions shown in FIG. 8.

Figure 4:
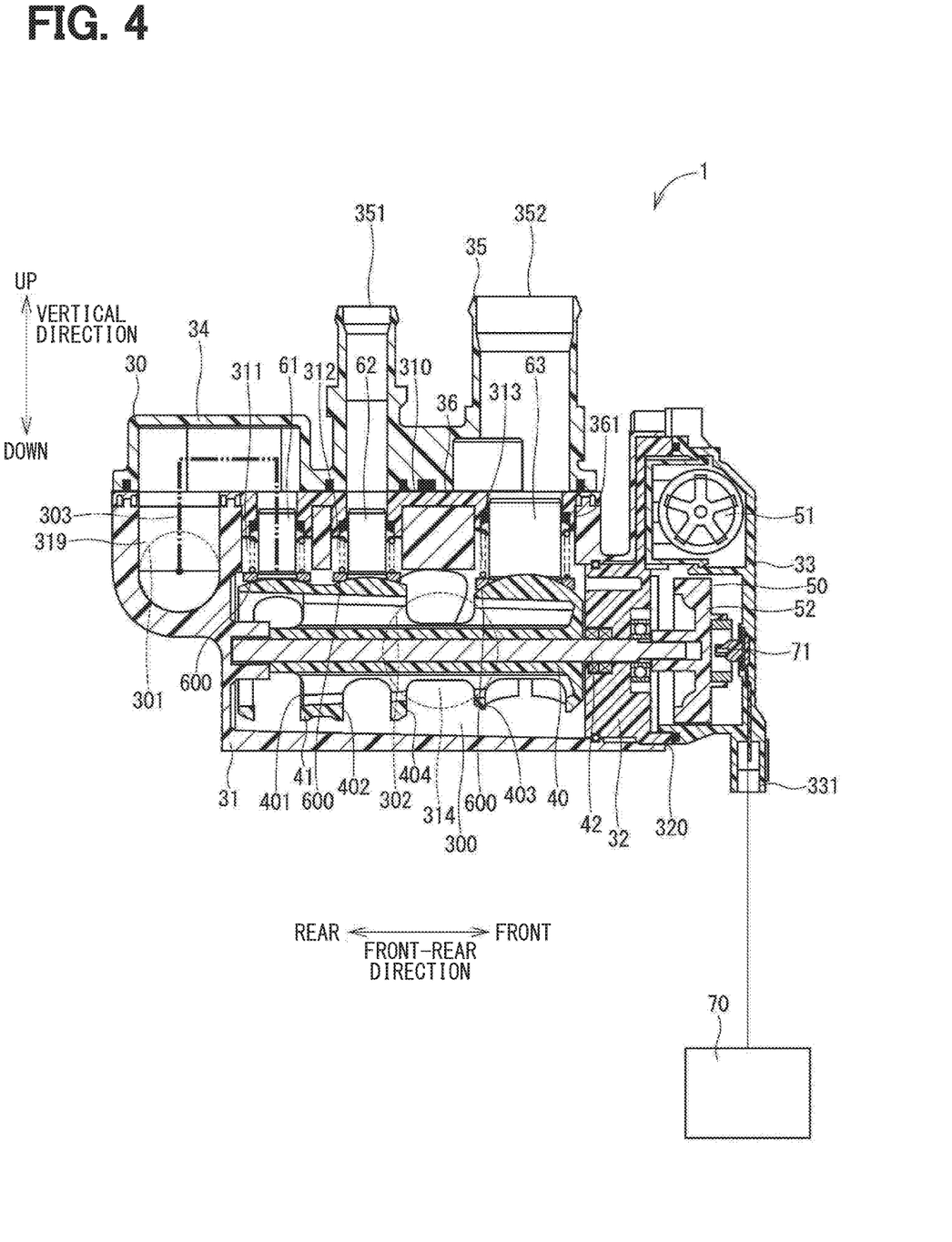
FIG. 4 is a cross-sectional view taken along line IV-IV of FIG. 2.
Figure 5:
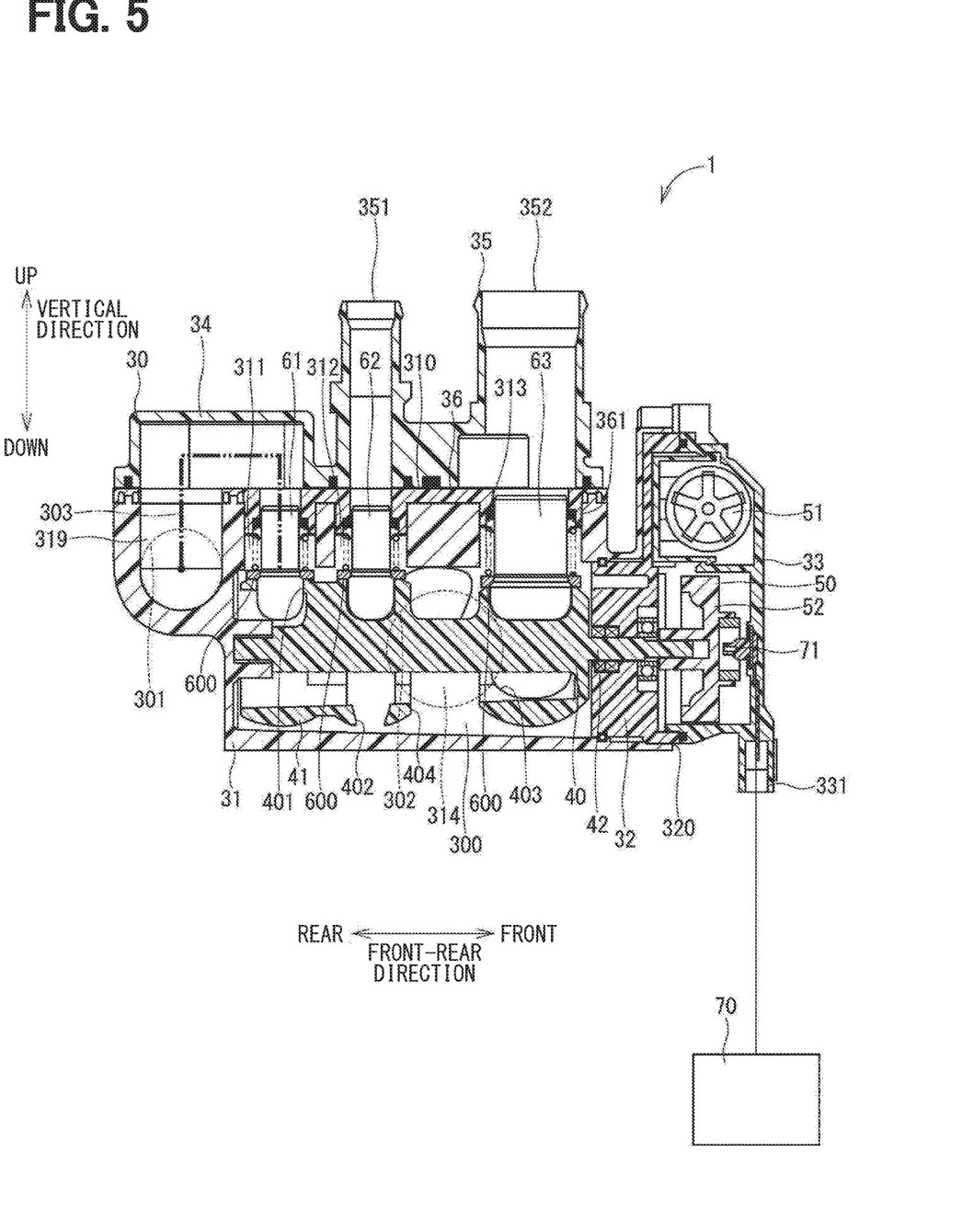
FIG. 5 is a cross-sectional view showing a valve of the cooling water control valve device according to the embodiment when it is located at a maximum end of a rotatable range.
Figure 6:
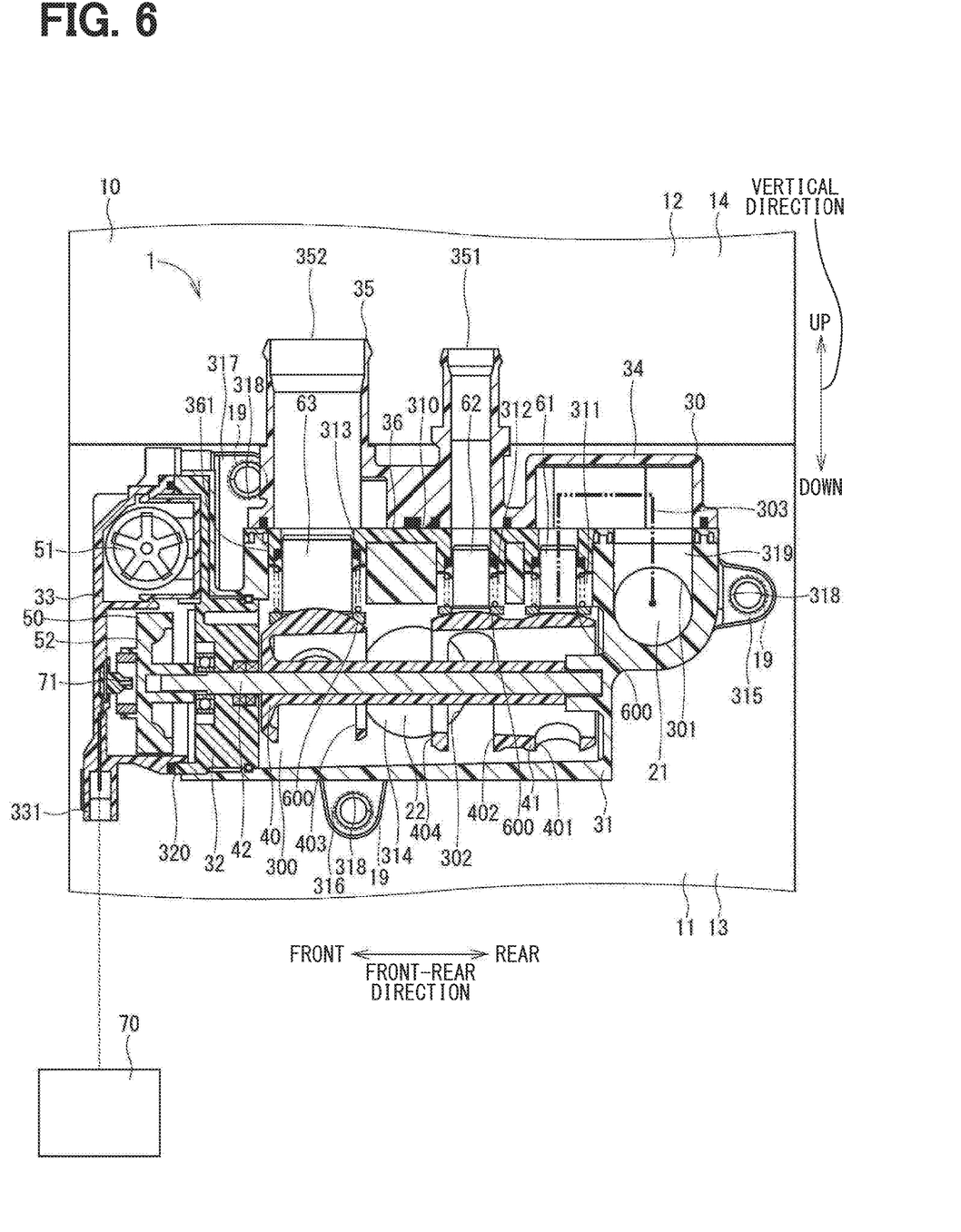
FIG. 6 is a cross-sectional view taken along a line VI-VI in FIG. 2.

When the rotational position of the valve 40 is 0, that is, when the valve 40 is in a state shown in FIG. 4, the opening ratio R2 of the valve opening 401, the opening ratio R2 of the valve opening 402, and the opening ratio R3 of the valve opening 403 are all 0%. At this time, the opening in the contact surface 600 of the valve seal 603 provided in each of the cylindrical spaces 311, 312, and 313 is closed by the outer circumferential wall of the valve body 41, and therefore all openings are closed. Therefore, all communication between the first and second inlet ports 301 and 302 and the outlet ports 351 and 352 is cut off. In the range where the rotational position of the valve 40 is between 0 and a1, R1, R2, and R3 are all 0%.

When the rotational position of the valve 40 changes from a1 to a2, the opening ratio R2 of the valve opening 402 gradually increases from 0% and reaches 100% at a2. Therefore, when the rotational position of the valve 40 changes from a1 to a2, the flow rate of the cooling water flowing out of the head chamber 18 toward the heater core 4 via the second outlet 22, the second inlet port 302, the inside space 300, and the outlet port 351 increases. Note that R2 has a constant value (100%) in the range where the rotational position of the valve 40 is from a2 to the maximum end of the rotatable range of the valve 40.

When the rotational position of the valve 40 changes from a3 to a4, the opening ratio R1 of the valve opening 401 gradually increases from 0% and reaches 50% at a4. Therefore, when the rotational position of the valve 40 changes from a3 to a4, the flow rate of the cooling water flowing out of the block passage 17 and into the inside space 300 via the first outlet 21, the first inlet port 301, and the bypass passage 303 increases. Note that R1 has a constant value (about 50%) when the rotational position of the valve 40 is in the range from a4 to a7.

When the rotational position of the valve 40 changes from a5 to a6, the opening ratio R3 of the valve opening 403 gradually increases from 0% and reaches 100% at a6. Therefore, when the rotational position of the valve 40 changes from a5 to a6, the flow rate of the cooling water flowing out of the inside space 300 and toward the radiator 3 through the outlet port 352 increases. At the same time, the flow rate of the cooling water flowing out of the inside space 300 and toward the heater core 4 through the outlet port 351 decreases. Note that R3 has a constant value (100%) in the range where the rotational position of the valve 40 is from a6 to the maximum end of the rotatable range of the valve 40.

When the rotational position of the valve 40 changes from a7 to a8, the opening ratio R1 of the valve opening 401 gradually decreases from about 50% to about 25% at a8. Therefore, when the rotational position of the valve 40 changes from a7 to a8, the flow rate of the cooling water flowing out of the block chamber 17 and into the inside space 300 via the first outlet 21, the first inlet port 301, and the bypass passage 303 decreases. At the same time, the flow rate of the cooling water flowing out of the head chamber 18 and into the inside space 300 via the second outlet 22 and the second inlet port 302 increases. Note that R1 has a constant value (about 25%) when the rotational position of the valve 40 is in the range from a8 to a9.

When the rotational position of the valve 40 changes from a9 to a1 0, the opening ratio R1 of the valve opening 401 gradually increases from 25% and reaches 100% at a1 0. Therefore, when the rotational position of the valve 40 changes from a9 to a1 0, the flow rate of the cooling water flowing out of the block passage 17 and into the inside space 300 via the first outlet 21, the first inlet port 301, and the bypass passage 303 increases. Note that R1 has a constant value (100%) in the range where the rotational position of the valve 40 is from a1 0 to the maximum end of the rotatable range of the valve 40.

In the range where the rotational position of the valve 40 is from a10 to the maximum end of the rotatable range of the valve 40, R1, R2, and R3 are all 100%. That is, the opening in the contact surface 600 of the valve seal 603 provided in each of the cylindrical spaces 311, 312, and 313 is not closed by the outer circumferential wall of the valve body 41, and all openings are open (see FIG. 5). Therefore, all communication between the first and second inlet ports 301 and 302 and the outlet ports 351 and 352 are allowed.

The ECU 70 controls the rotational position of the valve 40 to be in the range between 0 to a1, thereby the opening of the contact surface of the sealing 61 corresponding to the first inlet port 301, the opening of the contact surface of the sealing 62 corresponding to the outlet port 351, and the opening of the contact surface of the sealing 63 corresponding to the outlet port 352 are closed by the outer circumferential wall of the valve body 41. Then, all communication between the first inlet port 301, the second inlet port 302, the outlet port 351, and the outlet port 352 can be cut off. As described above, the ECU 70 controls the rotational position of the valve 40 to be in the range between 0 and a1 so as to cut off all communication between the first inlet port 301, the second inlet port 302, the outlet port 351, and the outlet port 352. This is called a "fully closed control."

The ECU 70 can control the amount of the cooling water from the block passage 17 into the inside space 300 via the first inlet port 301 by controlling the rotational position of the valve 40 to be within the range between a3 and a4. The control by the ECU 70 to control the rotational position of the valve 40 to be within the range between a3 and a4 so as to adjust the flow rate of the cooling water flowing into the inside space 300 via the first inlet port 301 is referred to as a "inflow control."

The ECU 70 can adjust the flow rate of the cooling water flowing out of the housing 30 through the outlet port 351 and the outlet port 352 by controlling the rotational position of the valve 40 to be within a range between a5 and a6. The control by the ECU 70 to control the rotational position of the valve 40 to be within the range between a5 and a6 so as to adjust the amount of the cooling water flowing out of the housing 30 via the outlet port 351 and the outlet port 352 is referred to as a "outflow control."

The ECU 70 can reduce the flow rate of the cooling water flowing into the inside space 300 via the first inlet port 301 while increasing the flow rate of the cooling water flowing into the inside space 300 via the second inlet port 302 by controlling the rotational position of the valve 40 to be within the range between a7 and a8. The control by the ECU 70 to reduce the flow rate of the cooling water flowing into the inside space 300 via the first inlet port 301 while increasing the amount of the cooling water flowing into the internal space 300 via the second inlet port 302 by controlling the rotational position of the valve 40 to be within the range between a7 and a8 is referred to as a "port flow rate control."

The ECU 70 can execute the above-described "fully closed control", "inflow control", "outflow control", and "port flow rate control" according to operating conditions of the engine 10. For example, when the engine 10 is cold at the time of start, the ECU 70 executes the "fully closed control" to stop the flow of the cooling water in the engine 10 and to warm the engine 10 quickly. As a result, the sliding resistance of the engine 10 can be reduced, fuel efficiency can be improved, and emissions can be reduced.

For example, prior to cooling the cooling water by the radiator 3, the ECU 70 can suppress the boiling of the cooling water in the block flow path 17 by having the cooling water flow through the block channel 17 by executing the "inflow control."

The ECU 70 can adjust the temperature of the engine 10 to an appropriate temperature by executing the "outflow control" during a regular operation of the engine 10, for example, so that knocking is suppressed and the operating efficiency of the engine 10 can be maintained to be an appropriate range.

For example, at the time of high-load operation of the engine 10, the ECU 70 can increase cooling power for the engine head 12 by executing the "port flow rate control" so that the operating efficiency of the engine 10 can be maintained to be an appropriate range.

Figure 2:
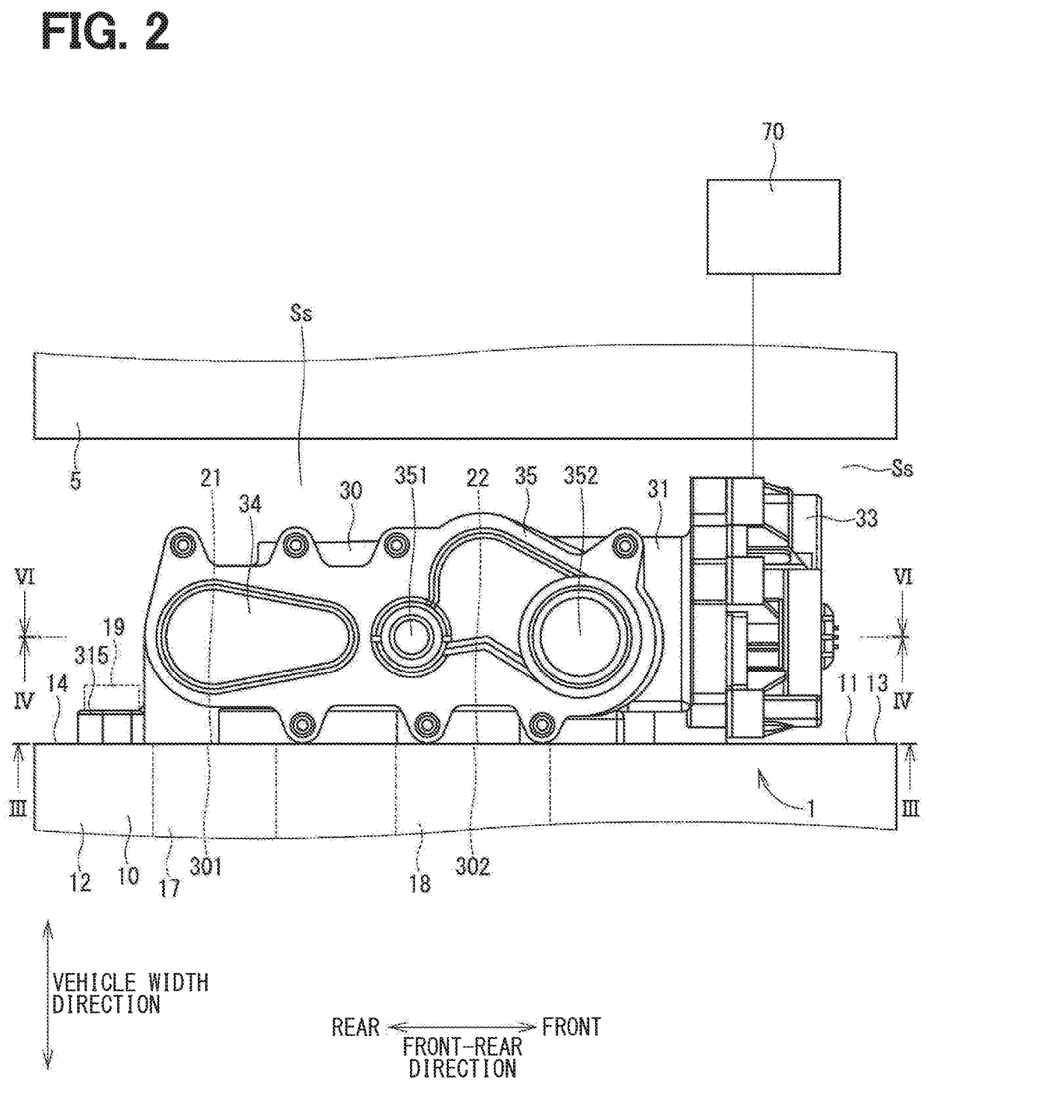
FIG. 2 is a plan view showing the cooling water control valve device according to the embodiment.
Figure 3:
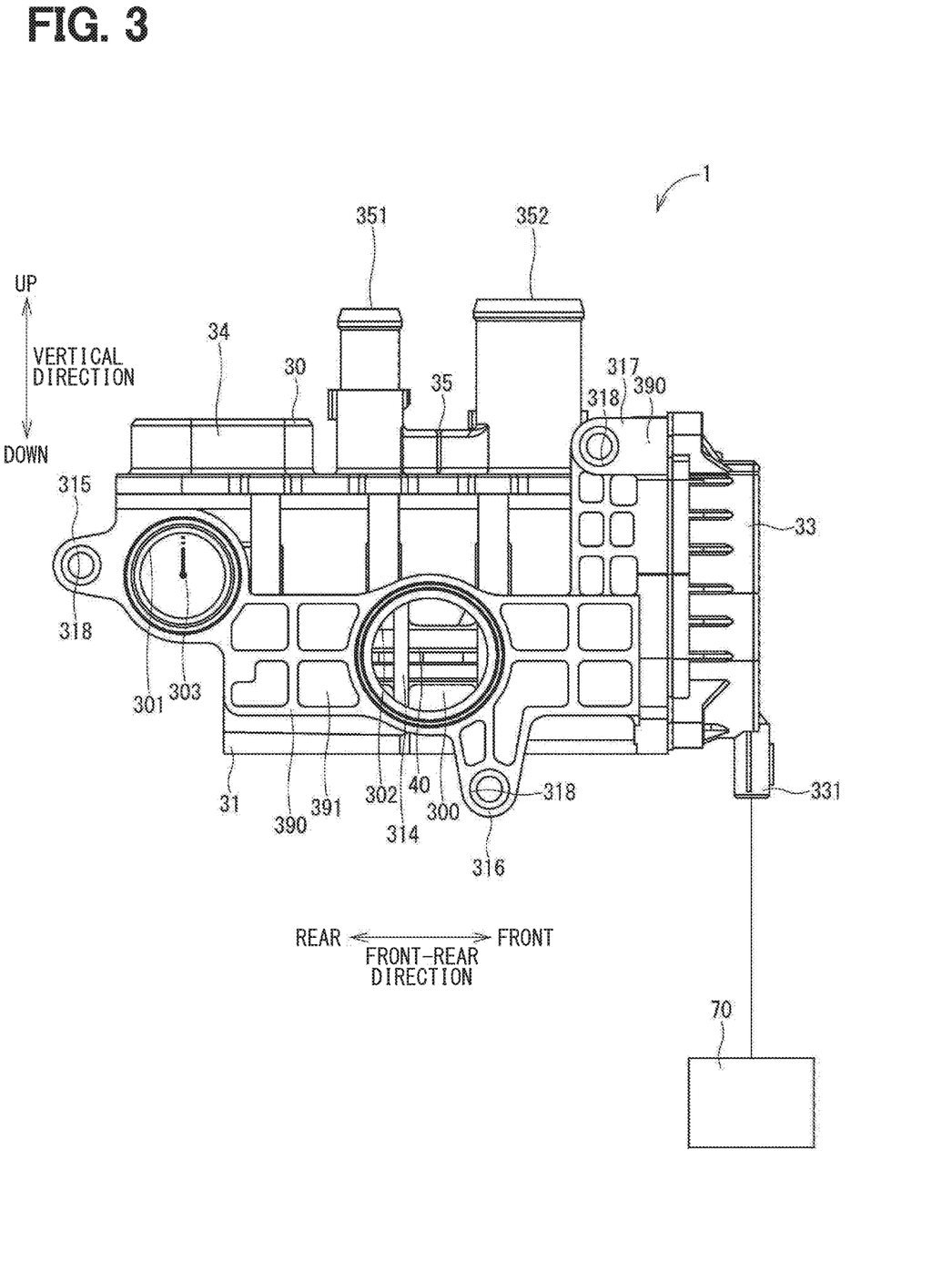
FIG. 3 is a cross-sectional view taken along the line III-III of FIG. 2.

As shown in FIG. 2, in a vehicle to which the cooling water control valve device 1 of the present embodiment is applied, a power converter 5 is disposed in the engine 10 at a position facing the block outer wall 13 and the head outer wall 14. The power converter 5 is configured to adjust power supplied to a motor (not shown) that functions as a driving source of the vehicle together with the engine 10. Here, a narrow space Ss is formed between the block outer wall 13 (the head outer wall 14) of the engine 10 and the power converter 5. The size of the narrow space Ss is relatively small.

All components of the cooling water control valve device 1 of the present embodiment except the ECU 70 are provided in the narrow space Ss. In the present embodiment, the bypass passage 303 that connects the first inlet port 301 and the internal space 300 is formed in the housing 30 to bypass the valve 40. In a state where the housing 30 is attached to the engine 10, the bypass passage 303 extends from the first inlet port 301 toward the power converter 5 in a direction perpendicular to the attachment surface 390, and then extends upward in the vertical direction that is parallel to the attachment surface 390. The bypass passage 303 further extends forward in the front-rear direction of the vehicle and then extends downward in the vertical direction to be fluidly connected to the inside space 300. The cylindrical sealing 61 is provided in the cylindrical space 311 corresponding to the end of the bypass channel 303 close to the inside space 300 so that its axis is parallel to the attachment surface 390.

In the present embodiment, as described above, since a part of the bypass passage 303 is formed to extend in a direction parallel to the attachment surface 390, the size of the housing 30 in a direction perpendicular to the attachment surface 390 can be reduced. In addition, by arranging the sealing member 61 having a predetermined length in the axial direction so that its axis is parallel to the attachment surface 390, the size of the housing 30 in a direction perpendicular to the attachment surface 390 can be prevented from increasing. Therefore, even when the housing 30 is attached to the engine 10 with the first inlet port 301 facing the engine 10 and when the sealing member 61 is disposed between the first inlet port 301 and the valve 40, the housing 30 of the cooling water control valve device 1 can be easily set in the narrow space Ss facing the block outer wall 13 and the head outer wall 14 of the engine 10.

In the present embodiment, the cylindrical spaces 311 to 313 are formed to open on the specific outer wall 310 that is one of the plurality of outer walls forming the outline of the housing body 31 and that faces in the same direction, i.e., the upper side in the vertical direction. In addition, each of the sealing members 61 to 63 is provided in a respective one of the cylindrical spaces 311 to 313. Accordingly, when the sealing members 61 to 63 are provided in the cylindrical spaces 311 to 313, it is not necessary to rotate the housing body 31, and thus the manufacturing process of the cooling water control valve device 1 can efficiently performed.

Figure 9:
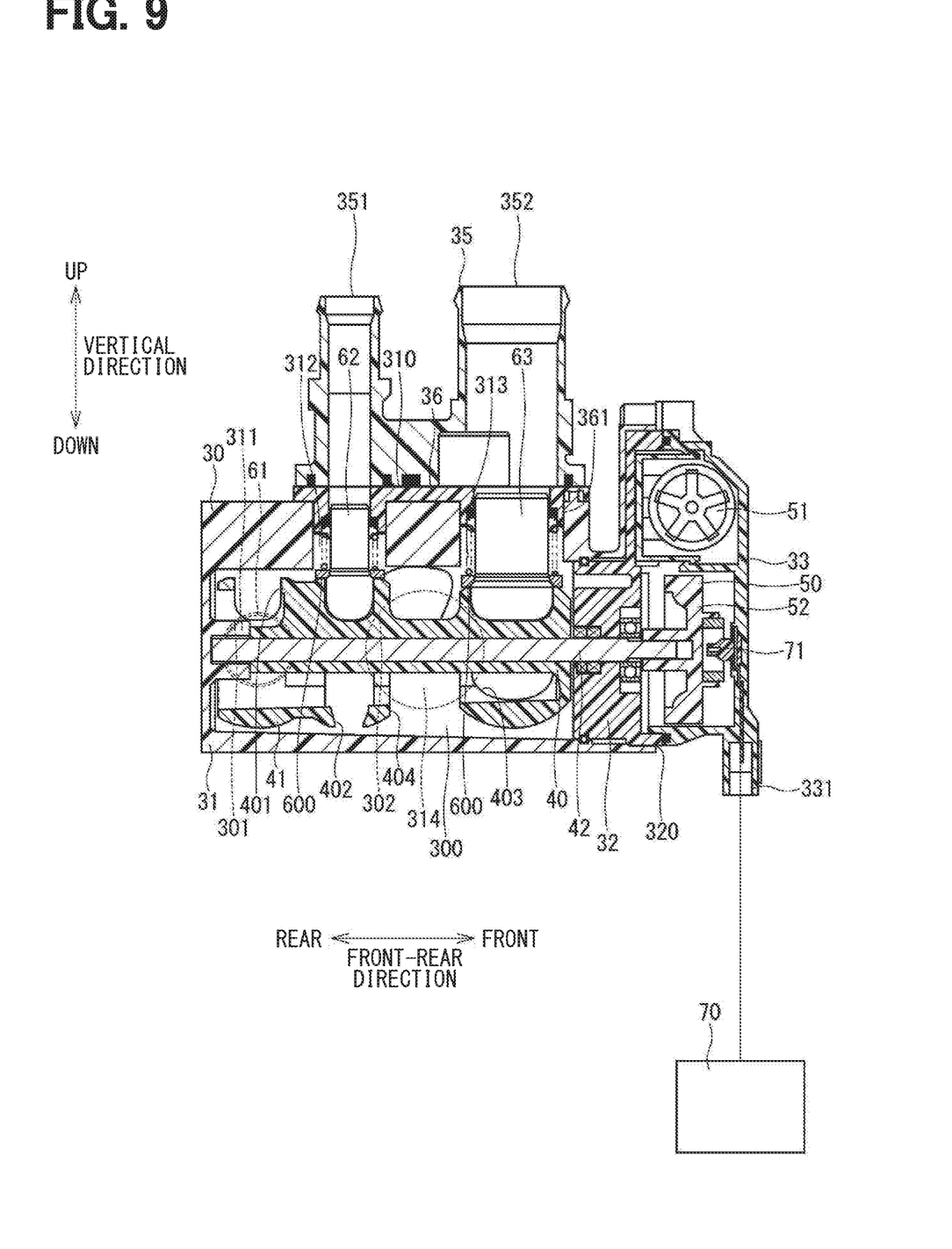
FIG. 9 is a cross-sectional view showing a cooling water control valve device according to a comparative example.
Figure 10:
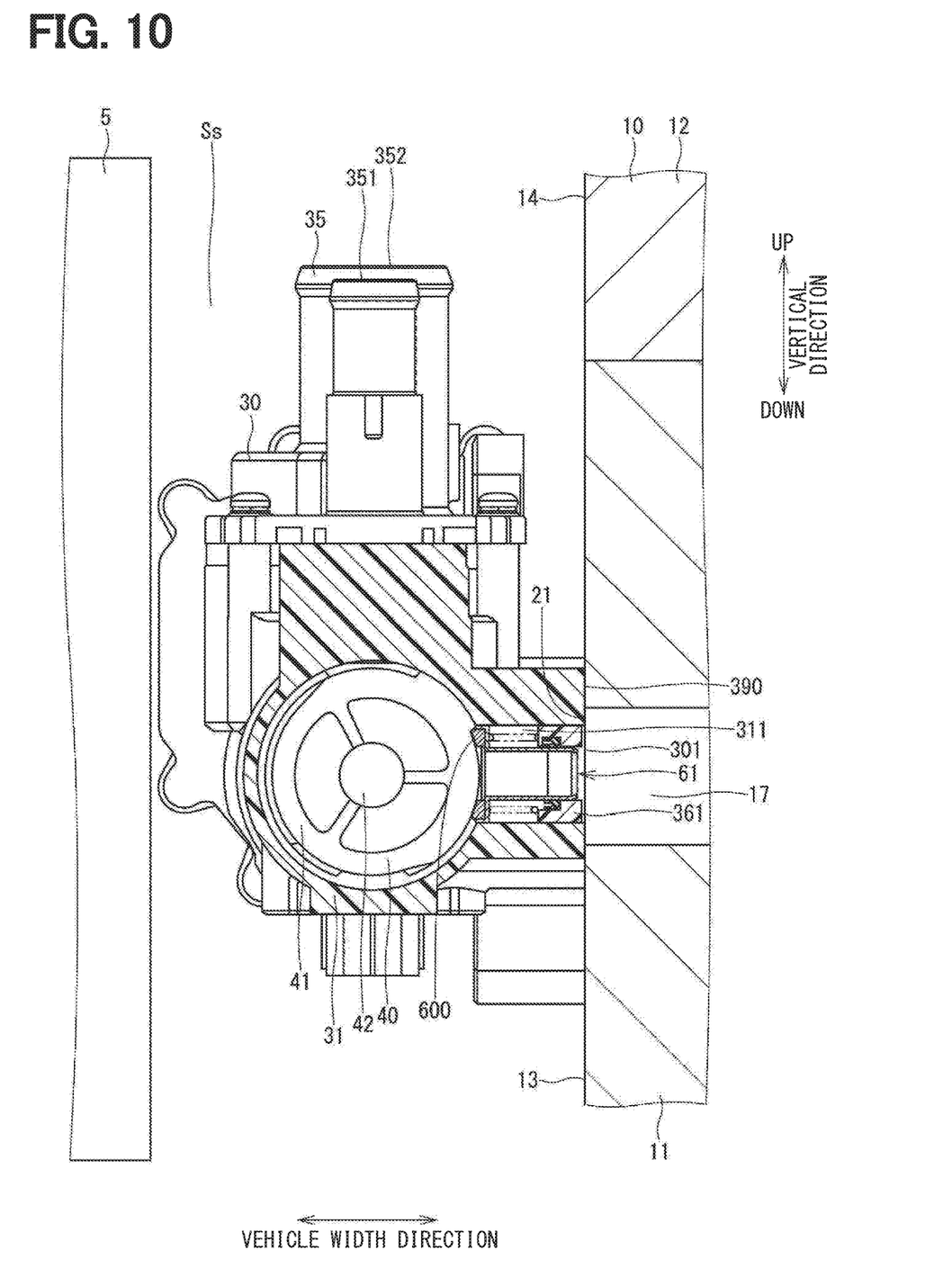
FIG. 10 is a cross-sectional view showing the cooling water control valve device according to the comparative example.

Next, an advantage of the present embodiment over a comparative example will be described by comparing a cooling water control valve device according to the comparative example with the present embodiment. As shown in FIGS. 9 and 10, in the comparative example, the housing 30 does not have the bypass passage forming member 34 as shown in the present embodiment. Further, the bypass passage 303 in the comparative example is not formed in the housing body 31, and the cylindrical space 311 is formed in a substantially cylindrical shape so as to fluidly connect the first inlet port 301 and the inside space 300. The sealing member 61 is disposed in the cylindrical space 311 such that the contact surface 600 is in contact with the outer circumferential wall of the valve body 41 (see FIG. 10). Therefore, in the comparative example, the size of the housing 30 in a direction perpendicular to the attachment surface 390 is larger than that of the present embodiment. Therefore, it may be difficult to dispose the housing 30 of the cooling water control valve device in the narrow space Ss that faces the outer wall of the engine 10.

On the contrary, in the present embodiment, the bypass passage 303 is formed in the housing 30, and the sealing member 61 is disposed so that its shaft is parallel to the attachment surface 390. As a result, the size of the housing 30 in a direction perpendicular to the attachment surface 390 can be reduced as compared with the comparative example. Therefore, the housing 30 of the cooling water control valve device 1 can be easily disposed in the narrow space Ss that faces the outer wall of the engine 10.

As described above, the cooling water control valve device 1 is attached to the engine 10, and the device 1 is capable of controlling a flow rate of cooling water flowing through the engine 10. The device 1 includes the housing 30 and the valve 40. The housing 30 includes the inside space 300, the attachment surface 390, the first inlet port 301, the second inlet port 302, and the outlet ports 351, 352. The planar attachment surface 390 is configured to be in contact with the outer wall of the engine 10 The first inlet port 301 is in communication with the inside space 300 and open on the planar attachment surface 390. The cooling water from the engine 10 flows into the first inlet port 301 and the second inlet port 302. The inside space 300 is in communication with an outside through the outlet ports 351, 352. The valve 40 is disposed in the inside space 300 to control communication between the first and second inlet ports 301, 302 and the outlet ports 351, 352 by rotating.

The housing 30 includes the housing body 31 that defines the inside space 300 therein and the bypass passage forming member 34 that defines at least a portion of the bypass passage 303. The bypass passage 303 bypasses the valve 40 and fluidly connects between the first inlet port 301 and the inside space 300. The housing 30 is attached to the engine 10 such that the attachment surface 390 comes into contact with the outer wall of the engine 10. Accordingly, by forming a part of the bypass passage 303 to extend in a direction parallel to the attachment surface 390, the size of the housing 30 in a direction perpendicular to the attachment surface 390 can be reduced. Thus, even when the housing 30 is attached to the engine 10 with the first inlet port 301 facing the engine 10, the housing 30 of the cooling water control valve device 1 can be easily set in the narrow space Ss facing the outer wall of the engine 10.

In the present embodiment, the valve 40 includes the cylindrical valve body 41 that is rotatable about the axis and the valve openings 401, 404, 402, 403 that are configured to fluidly connect between the inner circumference and the outer circumference of the valve body 41. The valve openings 401, 404, 402, 403 are in communication with the first inlet port 301, the second inlet port 302, and the outlet ports 351, 352, respectively, depending on a rotational position of the valve body 41. The present embodiment further includes the sealing members 61 to 63. Each of the sealing members 61 to 63 has the annular contact surface 600 that is in contact with the outer wall of the valve body 41 in the space between the first inlet port 301 and the valve 40, the space between the outlet port 351 and the valve 40, and the space between the outlet port 352 and the valve 40 among the spaces between the first and second inlet ports 301, 302, the outlet ports 351, 352 and the valve 40. The space between the contact surface 600 and the outer wall of the main body 41 can be maintained in a liquid-tight manner. Accordingly, it is possible to prevent cooling water from releasing when the space between the first inlet port 301 and the valve 40, the space between the outlet port 351 and the valve 40, and the space between the outlet port 352 and the valve 40 are closed by the outer wall of the valve body 41.

In the present embodiment, the housing 300 further includes the cylindrical spaces 311, 314, 312, 313 that fluidly connect between the inside space 300 and the outer wall of the housing body 31 and are configured to fluidly connect between each of the valve openings 401, 404, 402, 403 and the corresponding one of the first inlet port 301, the second inlet port 302, and the outlet ports 351, 352. The sealing members 61 to 63 are provided such that the contact surface 600 are in contact with the outer circumferential wall of the valve body 41 in each of the cylindrical spaces 311 to 313. The cylindrical spaces 311 to 313 provided with the sealing members 61 to 63 are open on the specific outer wall 310 which is one of the plurality of outer walls forming the outline of the housing body 31 and faces in the same direction as the cylindrical spaces. Thus, when the sealing members 61 to 63 are set in the cylindrical spaces 311 to 313, it is not necessary to rotate the housing body 31, and therefore the manufacturing process of the cooling water control valve device 1 can be efficiently performed.

In the present embodiment, the housing 30 further includes a pipe 35 that defines the outlet ports 351, 352 and is separately formed from the housing body 31. In the present embodiment, the bypass passage forming member 34 and the pipe 35 are integrally formed. Therefore, the number of parts can be reduced, and manufacturing and assembling steps can be reduced. As a result, the manufacturing costs can be reduced. Further, it is not necessary to separately provide a pipe or the like that forms a part of the bypass passage 303.

Other Embodiments

In another embodiment of the present disclosure, the bypass passage may be formed to bypass the valve 40 and fluidly connect the second inlet port 302 and the inside space 300.

In another embodiment of the present disclosure, the housing 30 may be configured to have one inlet port or three or more inlet ports. Furthermore, the housing 30 may be configured to have one outlet port or three or more outlet ports.

In another embodiment of the present disclosure, the sealing member may be disposed in at least one of the spaces between the first inlet port 301 and the valve 40, between the second inlet port 302 and the valve 40, and between the outlet ports 351 and 352 and the valve 40. Alternatively, the sealing may not be used.

Further, in another embodiment of the present disclosure, the plurality of cylindrical spaces provided with the sealing members are not necessarily formed on only the specific outer wall 310 that is the outer wall facing in the same direction among the plurality of outer walls forming the outline of the housing body 31. Alternatively, the cylindrical spaces may be opened on another outer wall.

Further, in another embodiment of the present disclosure, the bypass passage forming member 34 may be formed separately from the pipe 35. Further, the bypass passage forming member 34 or the pipe 35 may be integrally formed with the housing body 31. In another embodiment of the present disclosure, the control unit that controls the operation of the motor 51 may be disposed in the housing 30, for example, inside the cover 33. In another embodiment of the present disclosure, the control unit may not be used. As described above, the present disclosure is not limited to the above embodiments, but may be practiced in various other modes without departing from the subject matters of the present disclosure.

The present disclosure has been described based on the embodiments. However, the present disclosure is not limited to the embodiments and structures. The present disclosure also encompasses various modifications and variations within the scope of equivalents. Furthermore, various combination and formation, and other combination and formation including one, more than one or less than one element may be made in the present disclosure.

The invention claimed is:

1. A cooling water control valve device that is attached to an engine and is capable of controlling a flow rate of the cooling water flowing through the engine, the device comprising:
    a housing that includes an inside space, the inside space defined by a portion of the housing within which a valve body resides, an attachment surface, at least one inlet port, and at least one outlet port, the attachment surface configured to be in contact with an outer wall of the engine, the at least one inlet port being in communication with the inside space and open on the attachment surface, the cooling water from the engine flowing into the at least one inlet port, the inside space being in communication with an outside through the at least one outlet port; and
    a valve, comprising the valve body, that is disposed in the inside space to control communication between the at least one inlet port and the at least one outlet port by rotating, wherein
    the housing includes a housing body that defines the inside space therein and a bypass passage forming member that defines at least a portion of a bypass passage,
    the bypass passage is fluidly, directly connected to both the at least one inlet port and the inside space such that the cooling water from the at least one inlet port bypasses the valve and then flows into the inside space, and
    the housing is attached to the engine such that the attachment surface comes into contact with the outer wall of the engine.

2. The cooling water control valve device according to claim 1, wherein
    the valve body of the valve includes a cylindrical valve body that is rotatable about an axis thereof and a plurality of valve openings that are configured to fluidly connect an inner circumferential wall and an outer circumferential wall of the cylindrical valve body, each of the plurality of valve openings capable of being in communication with the at least one inlet port and the at least one outlet port depending on a rotational position of the cylindrical valve body, and the cooling water control valve further comprises
   a sealing member that includes an annular contact surface that is in contact with the outer circumferential wall of the cylindrical valve body in at least one of spaces between the at least one inlet port and the valve and between the at least one outlet port and the valve, wherein
the sealing member is configured to seal a space between the contact surface and the outer circumferential wall of the cylindrical valve body in a liquid-tight manner.

3. The cooling water control device according to claim 2, wherein
   the housing further includes a plurality of cylindrical spaces that fluidly connect the inside space and an outer wall of the housing body and configured to fluidly connect each of the plurality of valve openings and each of the at least one inlet port and the at least one outlet port,
   the sealing member is a plurality of sealing members,
   the contact surface of each of the plurality of sealing members is in contact with the outer circumferential wall of the cylindrical valve body in each of at least two cylindrical spaces of the plurality of cylindrical spaces,
   the at least two cylindrical spaces are open on a specific outer wall of a plurality of outer walls that define an outline of the housing body, and
   the specific outer wall faces in a same direction as opening directions of the at least two cylindrical spaces.

4. The cooling water control device according to claim 1, wherein
   the housing further includes a pipe that defines the at least one outlet port and that is separately formed from the housing body, and
   the bypass passage forming member is integrally formed with the pipe.

\* \* \* \* \*